(12) United States Patent
Guo et al.

(10) Patent No.: US 10,949,909 B2
(45) Date of Patent: Mar. 16, 2021

(54) OPTIMIZED RECOMMENDATION ENGINE

(71) Applicant: SAP SE, Walldorf (DE)

(72) Inventors: Xiaoyong Guo, Shanghai (CN); Dong Wang, Shanghai (CN); Yinghua Chen, Shanghai (CN)

(73) Assignee: SAP SE, Walldorf (DE)

( * ) Notice: Subject to any disclaimer, the term of this patent is extended or adjusted under 35 U.S.C. 154(b) by 783 days.

(21) Appl. No.: 15/441,283

(22) Filed: Feb. 24, 2017

(65) Prior Publication Data

US 2018/0247362 A1 Aug. 30, 2018

(51) Int. Cl.
| | |
|---|---|
| *G06N 99/00* | (2019.01) |
| *G06Q 30/00* | (2012.01) |
| *G06Q 30/02* | (2012.01) |
| *G06F 17/27* | (2006.01) |
| *G06Q 40/02* | (2012.01) |
| *G06Q 30/06* | (2012.01) |
| *G06Q 40/08* | (2012.01) |
| *G06N 3/08* | (2006.01) |
| *G06N 20/10* | (2019.01) |

(52) U.S. Cl.
CPC ......... *G06Q 30/0631* (2013.01); *G06N 3/084* (2013.01); *G06N 20/10* (2019.01); *G06Q 40/08* (2013.01)

(58) Field of Classification Search
CPC .... G06Q 30/0631; G06Q 40/08; G06N 20/10; G06N 3/084
USPC ....................................................... 706/1–62
See application file for complete search history.

(56) References Cited

U.S. PATENT DOCUMENTS

| | | | |
|---|---|---|---|
| 6,427,141 B1 | 7/2002 | Barnhill | |
| 8,332,390 B2 | 12/2012 | Yan et al. | |
| 8,355,934 B2 | 1/2013 | Virdhagriswaran | |
| 8,543,445 B2 | 9/2013 | Hall, III | |
| 8,549,001 B1 | 10/2013 | Minevski et al. | |
| 9,020,866 B1* | 4/2015 | Zhou | G06F 16/24578 706/13 |
| 10,235,623 B2* | 3/2019 | Lin | G06N 3/0472 |
| 2003/0130899 A1* | 7/2003 | Ferguson | G06Q 30/06 705/26.1 |

(Continued)

OTHER PUBLICATIONS

Caraciolo, M. (May 4, 2011). Evaluating recommender systems (Year: 2011).*

(Continued)

*Primary Examiner* — Brandon S Cole
(74) *Attorney, Agent, or Firm* — Klarquist Sparkman, LLP (57) ABSTRACT

A framework for generating optimized recommendations is described herein. For example, an optimized customer recommendation engine is described herein. Customer data is collected and pre-processed into a data model. Recommendations are calculated and provided by an aggregated method. The aggregated output is generated based on the outputs of a real-time prediction model and an offline modeling process. The real-time prediction model may be an online modeling training technique based on support vector machines (SVM) to classify customers and provide quick recommendations. The offline modeling process may be a learning process based on a back-propagation artificial neural network (BP-ANN) to provide with reliable predictions. Validation may be introduced to evaluate the accuracy of the recommendation model.

20 Claims, 9 Drawing Sheets

(56) References Cited

U.S. PATENT DOCUMENTS

| | | | | |
|---|---|---|---|---|
| 2003/0139908 A1* | 7/2003 | Wegerich | ........... | G06K 9/00536 |
| | | | | 702/183 |
| 2006/0162466 A1* | 7/2006 | Wargo | ..................... | G01F 1/363 |
| | | | | 73/861.63 |
| 2007/0095168 A1* | 5/2007 | Vince | ..................... | G01N 23/12 |
| | | | | 75/500 |
| 2008/0120129 A1* | 5/2008 | Seubert | .................. | G06Q 10/10 |
| | | | | 705/35 |
| 2008/0294621 A1* | 11/2008 | Kanigsberg | ............ | G06Q 30/02 |
| 2009/0063132 A1* | 3/2009 | Miyazaki | .............. | G06F 16/345 |
| | | | | 704/9 |
| 2009/0195656 A1* | 8/2009 | Zhou | ...................... | G09B 19/00 |
| | | | | 348/169 |
| 2010/0057509 A1* | 3/2010 | Kumar | ................... | G06Q 10/10 |
| | | | | 703/2 |
| 2010/0057548 A1 | 3/2010 | Edwards | | |
| 2010/0100398 A1* | 4/2010 | Auker | ................... | G06Q 10/087 |
| | | | | 705/4 |
| 2011/0112994 A1* | 5/2011 | Goto | ...................... | G06Q 30/02 |
| | | | | 706/12 |
| 2011/0264511 A1* | 10/2011 | Zhang | ................... | G06Q 30/02 |
| | | | | 705/14.43 |
| 2012/0209707 A1* | 8/2012 | Ramer | ................ | G06F 16/9535 |
| | | | | 705/14.51 |
| 2013/0013308 A1* | 1/2013 | Cao | .................... | G06Q 30/0271 |
| | | | | 704/237 |
| 2013/0173323 A1* | 7/2013 | Diao | ..................... | G06Q 10/06 |
| | | | | 705/7.13 |
| 2013/0173509 A1* | 7/2013 | Bjork | ................... | G06K 9/6256 |
| | | | | 706/12 |
| 2014/0081671 A1 | 3/2014 | Schaad | | |
| 2014/0156560 A1 | 6/2014 | Sarkany et al. | | |
| 2014/0330159 A1* | 11/2014 | Costa | ................... | A61B 5/1124 |
| | | | | 600/558 |
| 2016/0104070 A1* | 4/2016 | Eslami | .................. | G06N 7/005 |
| | | | | 706/12 |
| 2016/0106935 A1* | 4/2016 | Sezan | ................... | A61M 15/00 |
| | | | | 128/203.14 |
| 2017/0237792 A1* | 8/2017 | Taghavi | ................ | H04L 65/602 |
| | | | | 709/219 |
| 2017/0365008 A1* | 12/2017 | Schreier | ................ | G06Q 50/16 |
| 2018/0060326 A1* | 3/2018 | Kuo | ...................... | G06F 16/353 |
| 2018/0075175 A1* | 3/2018 | Chang | .................... | G06F 17/18 |
| 2018/0247362 A1* | 8/2018 | Guo | ...................... | G06Q 40/08 |

OTHER PUBLICATIONS

Alpaydin, Ethem, Introduction to Machine Learning, 2010, Second Edition, The MIT Press, Cambridge, Massachusetts, London, England.

David E. Rumelhart et al., Learning Representations by Back-Propagating Errors, Letters to Nature, Oct. 9, 1986, pp. 533-536, Nature vol. 323, Nature Publishing Group, Hampshire, England.

Chih-Chung Chang and Chih-Jen Lin, LIBSVM: A Library for Support Vector Machines, ACM Transactions on Intelligent Systems and Technology (TIST), Apr. 2011, pp. 1-39, vol. 2 Issue 3, ACM Publications, New York, USA.

Corinna Cortes and Vladimir Vapnik, Support-Vector Networks, Machine Learning, 1995, pp. 273-297, 20, Kluwer Academic Publishers, Boston.

\* cited by examiner

|  | Index | Gender | Age | BMI | Marital Status | Location | Education | Profession | Annual Income | Insurance Awareness | Hobbies |
|---|---|---|---|---|---|---|---|---|---|---|---|
|  | 301 | 302 | 303 | 304 | 305 | 306 | 307 | 308 | 309 | 310 | 311 |
| 301 | 1.0000 | 0.0138 | -0.2351 | -0.2450 | -0.0006 | -0.0049 | 0.7554 | -0.1217 | -0.2216 | 0.7768 | -0.0169 |
| 302 | 0.0138 | 1.0000 | -0.0207 | 0.0021 | -0.0012 | 0.0031 | 0.0300 | 0.0057 | -0.0074 | 0.0212 | 0.0077 |
| 303 | -0.2351 | -0.0207 | 1.0000 | 0.0587 | -0.0056 | 0.0151 | -0.2141 | 0.0389 | 0.0481 | -0.2298 | 0.0239 |
| 304 | -0.2450 | 0.0021 | 0.0587 | 1.0000 | 0.0022 | -0.0003 | -0.2140 | 0.0522 | 0.0759 | -0.2335 | 0.0044 |
| 305 | -0.0006 | -0.0012 | -0.0056 | 0.0022 | 1.0000 | 0.0246 | -0.0028 | 0.0048 | 0.0192 | -0.0084 | 0.0124 |
| 306 | -0.0049 | 0.0031 | 0.0151 | -0.0003 | 0.0246 | 1.0000 | -0.0007 | -0.0069 | 0.0072 | 0.0037 | -0.0092 |
| 307 | 0.7554 | 0.0300 | -0.2141 | -0.2140 | -0.0028 | -0.0007 | 1.0000 | -0.1154 | -0.2164 | 0.7449 | -0.0127 |
| 308 | -0.1217 | 0.0057 | 0.0389 | 0.0522 | 0.0048 | -0.0069 | -0.1154 | 1.0000 | 0.0153 | -0.1209 | 0.0144 |
| 309 | -0.2216 | -0.0074 | 0.0481 | 0.0759 | 0.0192 | -0.0072 | -0.2164 | 0.0153 | 1.0000 | -0.2196 | -0.0069 |
| 310 | 0.7768 | 0.0212 | -0.2298 | -0.2335 | -0.0084 | 0.0037 | 0.7449 | -0.1209 | -0.2196 | 1.0000 | -0.0096 |
| 311 | -0.0169 | 0.0077 | 0.0239 | 0.0044 | 0.0124 | -0.0092 | -0.0127 | 0.0144 | -0.0069 | -0.0096 | 1.0000 |

Table 300

Fig. 3a

Chart 320

Fig. 3b

| Variable Name 331 303 | Values 332 |
|---|---|
| Age (years old) 304 | 1. Less than 18<br>2. 18-30<br>3. 31-60<br>4. 61-80<br>5. More than 80 |
| Body Mass Index (BMI index) 307 | 1. Less than 18.5<br>2. 18.5-25<br>3. 25-28<br>4. 28-32<br>5. More than 32 |
| Educational background 308 | 1. Junior high school and below<br>2. Senior middle school<br>3. Secondary school<br>4. College<br>5. Undergraduate degree<br>6. Master degree<br>7. Doctoral degree |
| Occupation 309 | 1. Government/ Agriculture/ Forestry<br>2. Medical/ Hygiene/ Health/ Education/ Training<br>3. Financial/ Media/ Advertising/ Culture<br>4. Automotive/ Telematics<br>5. Consulting/ Outsourcing/ Human Services<br>6. Mechanical/ Manufacturing/ Consumer/ Trade<br>7. IT/ Internet/ Communications/ Electronics<br>8. Construction/ Property Management/ Real Estate<br>9. Logistics/ Warehouse/ Transportation<br>10. Energy/ Heavy industry |
| Annual Income (CNY) 310 | 1. Less than 50,000<br>2. 50,000-150,000<br>3. 150,000-300,000<br>4. 300,000-500,000<br>5. 500,000-1,000,000<br>6. More than 1,000,000 |
| Risk Awareness | From 1 to 10 according to the questionnaire. |

Data model 330

*Fig. 3c*

Model 400

*Fig. 4*

Model 500

Fig. 5

Process 600

Graph 710

Fig. 7b

OPTIMIZED RECOMMENDATION ENGINE

TECHNICAL FIELD

The present disclosure relates to computer systems, more specifically, to a framework for optimizing recommendations.

BACKGROUND

Certain types of industries, such as the insurance industry, have diverse customers with different needs. Diverse customers with different needs present challenges to companies. For example, it is difficult to produce products or provide services which satisfy needs of different customers. Due to the diverse needs and desires of different customers, it is difficult to mass market products and services.

In the case of an insurance company, it may have numerous products to offer. Traditionally, the insurance industry relies on one-to-one quotations and customizations by insurance agents to satisfy the various needs of different customers. However, this requires a high demand for human resources and therefore is costly and time consuming. Therefore, it is desirable to provide an efficient and reliable recommendation system to identify potential customers and to assist with marketing strategy for different insurance products in view of the market dynamics.

The present disclosure relates to a system and method for recommending potential customers to a sales agent in order to increase hit rate and improve cross-selling rate.

SUMMARY

A framework for generating optimized recommendations is described herein. For example, an optimized recommendation engine is described herein for optimizing customer recommendations in insurance industry. In accordance with one aspect, a computer-implemented method for providing recommendations is provided. At least one data variable which reveals a characteristic of customers of a product or service is provided. The at least one data variable is being analyzed by performing, for example, a correlation analysis. A data model is provided based on the analyzed data variables. An offline model training is performed at regular intervals. An online model training is performed upon request from a user. Recommendations are calculated and provided by an aggregated method. The aggregated output is generated based on the outputs of a real-time prediction model and an offline modeling process.

In another embodiment, a recommendation system is disclosed. The recommendation system includes a database and a recommendation engine. The database includes a customer database, a sales database and a knowledge database. The recommendation engine includes an offline model training module to perform offline training of a first model at regular intervals, an online model training module to perform online training of a second model in response to a user's request, an aggregation module to generate an aggregated output based on a first output of the first model and a second output of the second model, and a validation module to measure the accuracy of the recommendation system. The aggregation module then provides recommendations based on the aggregated output to user.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for generating optimized recommendations is described herein. Customer data is collected and pre-processed into a data model.

Recommendations are calculated by an aggregated method. The aggregated output is generated based on the outputs of a real-time prediction model and an offline modeling process. The real-time prediction model may be an online modeling algorithm based on support vector machines (SVM) to classify customers and provide quick recommendations. The offline modeling process may be a learning process based on a back-propagation artificial neural network (BP-ANN) to provide with reliable predictions. Validation may be introduced to evaluate the accuracy of the recommendation model. For example, a F-measure method may be introduced to measure the accuracy of the recommendation model.

It should be appreciated that the framework described herein may be implemented as a method, a computer-controlled apparatus, a computer process, a computing system, or as an article of manufacture such as a computer-usable medium. These and various other features and advantages will be apparent from the following description.

Figure 1A:
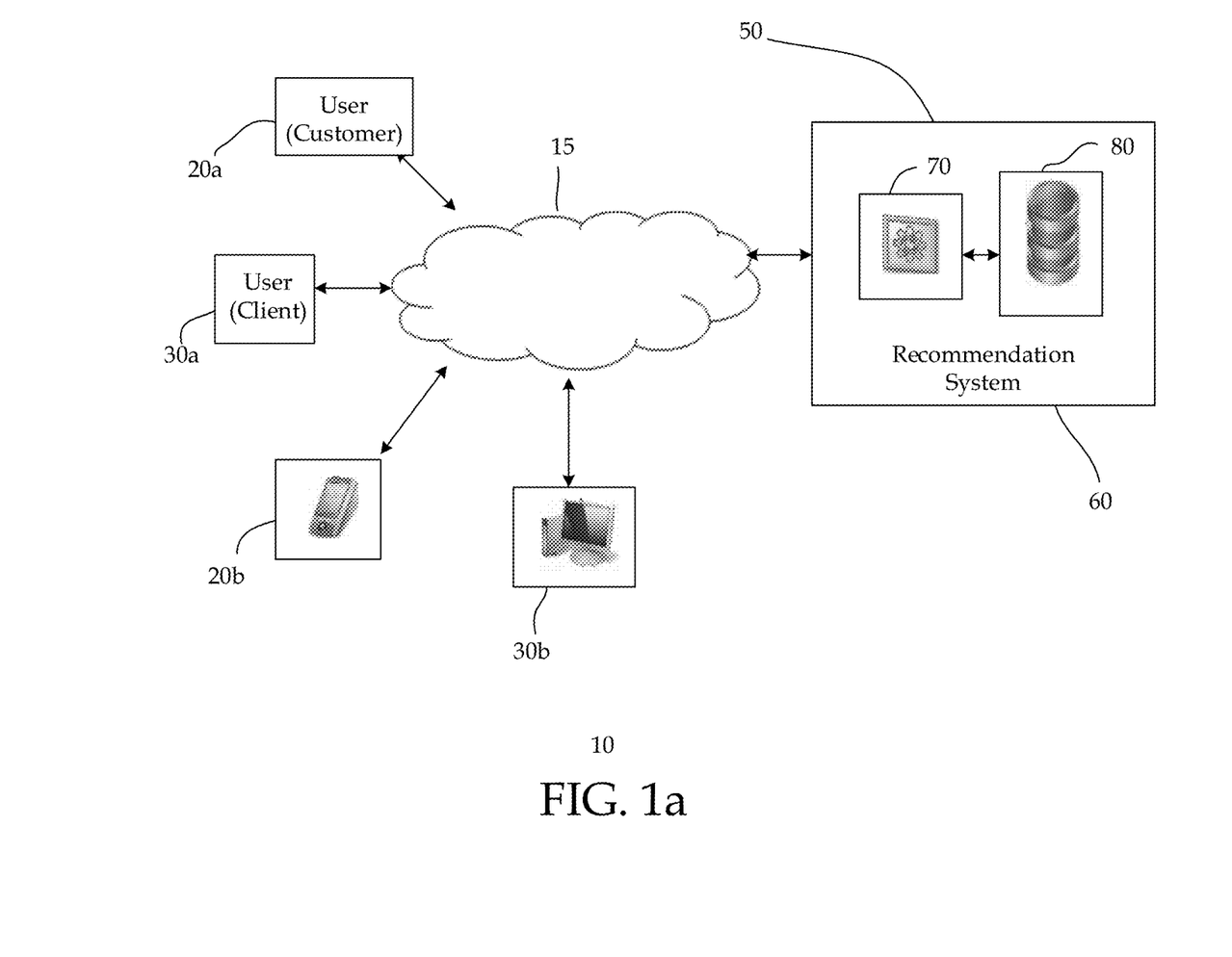
FIG. 1a shows an exemplary environment.

FIG. 1a shows an exemplary environment 10. The environment, for example, facilitates recommendations of products and services. In one embodiment, the environment facilitates recommendation of insurance products. The environment includes a communication network 15. The communication network may be, for example, the internet. Other types of communication networks or combination of networks may also useful. As shown, the environment includes one or more servers 50 and user devices (20a-b and 30a-b) coupled to the communication network. As shown, the environment includes different types of users using the user devices. For example, users may include customer users 20a-b and client users 30a-b. Customer users are customers of, for example, insurance products, while client users may be sales agents of insurance products. Other types of users may also be included.

A server 50 may include one or more computers. A computer includes a memory and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component.

In the case where the server includes more than one computer, they are connected through a communication network such as an internet, intranet, local area network (LAN), wide area network (WAN), internet or a combination thereof. The servers, for example, may be part of the same private network. The servers may be located in single or multiple locations. Other configurations of servers may also be useful. For example, the servers may form a cloud.

As for user devices, they may be any type of computing devices. A computing device, for example, includes a local memory and a processor. The computing device may further include a display. The display may serve as an input and output component of the user device. In some cases, a keyboard or pad may be included to serve as an input device. The memory may be volatile or non-volatile types of non-transitory computer-readable media such as magnetic media, optical media, RAM, ROM, removable media, or any other suitable memory component. Various types of processing devices may serve as user devices. For example, the user devices may include a personal computer (30b) or a mobile user device, such as a smart phone (20b). Other types of user devices, such as laptops or tablets may also be useful.

A user may connect to a server using a user device. The user device may be referred to as the user side while the server may be referred to as the server side. A user may access the server by logging in the user's respective account with, for example, a password using a user device. The user device may have an application interface or user interface (UI) which is used to communicate with the server. Alternatively, a web browser on the user device may be used. Other techniques for accessing the server may also be useful.

In one embodiment, the environment includes a recommendation system 60. In one embodiment, the recommendation system recommends insurance type products based on customer, sales and other information. Providing recommendations for other products or services may also be useful. The recommendation system is particularly useful for industries which have diverse customers with different needs and numerous products or services offered.

The recommendation system, for example, resides on a server (server 50). In one embodiment, the recommendation system includes a processor module 70 and a database module 80. The database module includes information for processing by the processor module. The database module, for example, may be an in-memory database, such as SAP HANA database. Other types of databases may also be useful. Other modules may be included in the recommendation system.

The recommendation system may be available to registered user as well as to non-registered users. For example, the system does not require a user to be registered with the recommendation system in order to use it. A registered user may log in to the recommendation system using a UI. Alternatively, a user may be an anonymous user. For example, an anonymous user may be a user who has not yet registered or a registered user who is using the recommendation system without being logged in.

The database module 80 may include user information of different registered users. User information, for example, may be information of customer user or client user. The user information may include various types of user information which may be obtained by various techniques. The user information, for example, may include information provided by the users directly and indirectly internal to the recommendation system as well information obtained through data mining external sources. For example, user information may be obtained from external sources, such as public and private data sources through data mining in the internet. For example, information can be obtained through social networks, government networks, as well as other types of networks or data sources.

As described, the user information is collected and stored in the database module. The processor module analyzes the data to generate a model from which recommendations may be based. For example, recommendations may be made to a specific user based on a model developed using data collected.

In one embodiment, the recommendation system recommends potential customers who may have higher tendencies for buying or engaging a product or service to a specific client user (e.g., a sales agent) based on the customer information. The recommendation system increases hit rates and cross-selling of products to customers by, for example, the client.

Figure 1B:
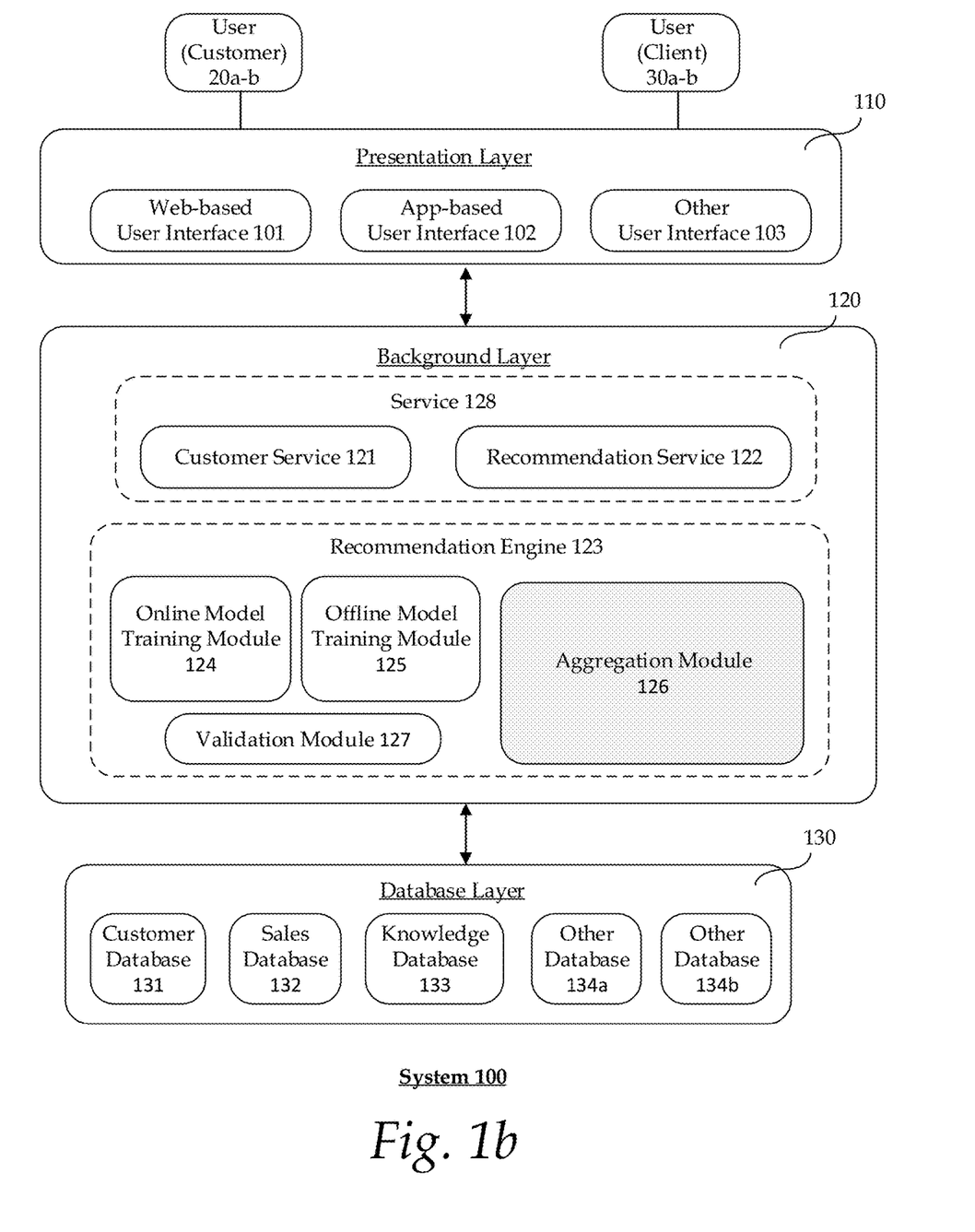
FIG. 1b is a block diagram illustrating an exemplary architecture of the recommendation system 100.

FIG. 1b is a block diagram illustrating an exemplary architecture of the recommendation system 100. The recommendation system 100 includes a presentation layer 110. A presentation layer may be a website-based (web-based) user interface 101, or an application-based (App-based) user interface 102, or other user interface 103. For example, a presentation layer may be an insurance website portal. A user (e.g., customer 20a-b or client 30a-b) accesses the website portal using a user device such as a personal computer (PC), a workstation, a network computer or a mobile device such as a laptop, tablet or a smartphone. Other types of user devices may also be used. The recommendation system may be a web-based system. For example, a user may connect to the service 128 using a user device. For example, the user device may include a browser connecting to the recommendation service 122 via a server 50. The recommendation system may act as a server and operate in a networked environment with users.

The recommendation system also includes a background layer 120. The background layer includes a service 128 and a recommendation engine 123. The service 128 includes a customer service 121 and a recommendation service 122. The service 128 may reside in one or more servers. A customer service 121 is used for exchanging the customer data between the database layer 130 (e.g., customer database 131) and the presentation layer 110 (e.g., customer 20a-b). A recommendation service 122 is used for combining the information from the database layer 130 and returning recommendation results to the presentation layer 110 (e.g., clients 30a-b).

The recommendation engine 123 may be implemented by the recommendation system 60. The recommendation engine 123 is used for performing data analysis by an online model training module 124, an offline model training module 125, an aggregation module 126, and a validation module 127. The online model training module 124 may employ a training technique based on support vector machines (SVM). The offline model training module 125 may be employ a training technique based on a 3-layer back-propagation artificial neural network (BP-ANN). The aggregation module 126 may combine the outputs of the online model training module (e.g., SVM) and the offline model training module (e.g., BP-AANN) to generate an aggregated output. The validation module 127 may be introduced to evaluate the accuracy of the recommendation model. For example, a F-measure method may be introduced to measure the accuracy of the recommendation model.

The recommendation system further includes a database layer 130. The database layer may reside in the database 80. Customer database 131 is used to store information relating to the customers, such as customer profiles, website customer information, customer behaviour data etc. Sales database 132 is used to store information relating to the market, such as purchase records, insurance products information, sales data etc. Knowledge database 133 is used to store analyzed data that extracted and mined from different statistics or rules. For example, the returning results recommended by the recommendation engine 123 are stored in the knowledge database 133 for further data analysis. In other words, the knowledge database enhances the learning experience of the recommendation system by continuously expanding the databases. Other data and information may be stored in other databases 134a and 134b.

Figure 2:
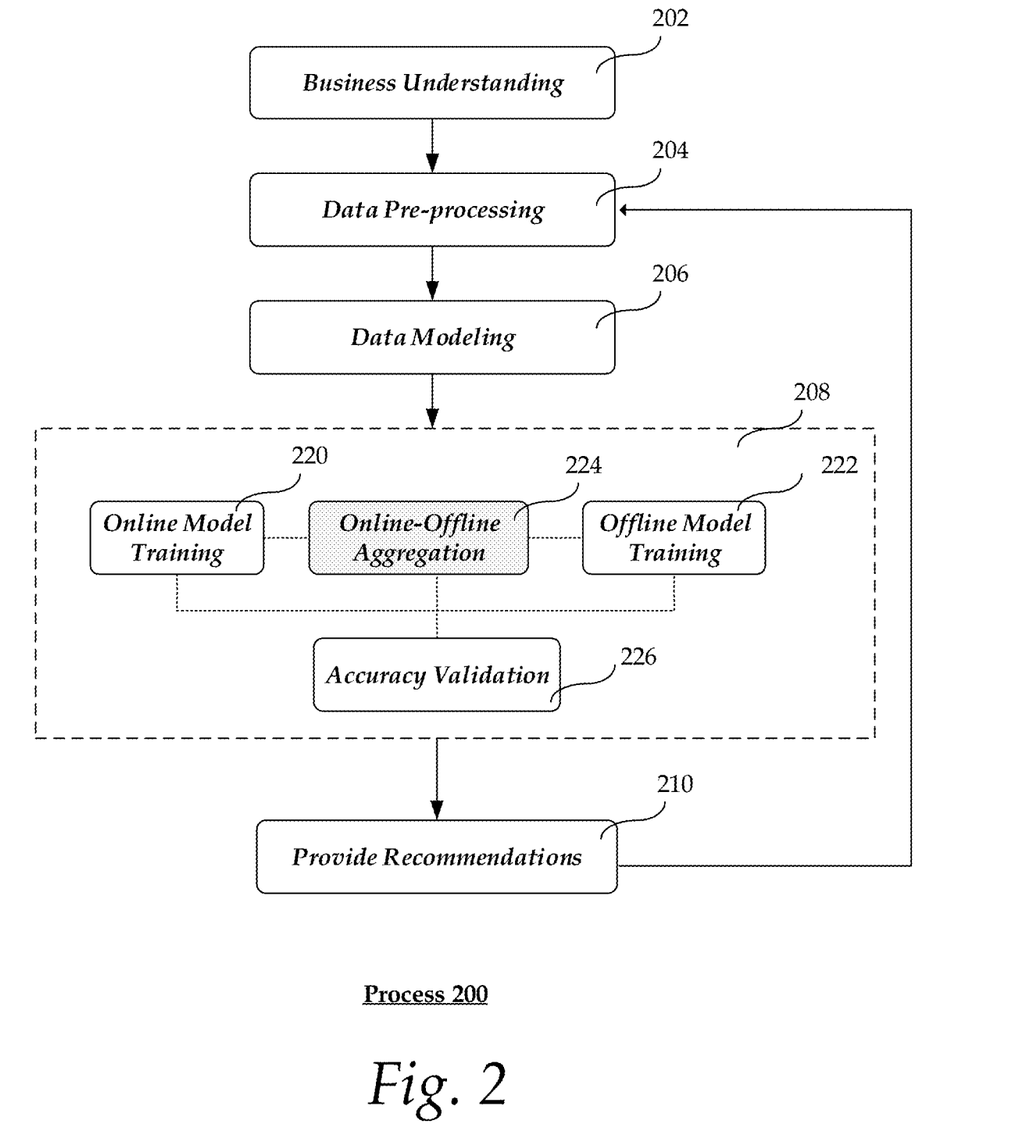
FIG. 2 shows an exemplary process 200 for providing optimized recommendations.

FIG. 2 shows an exemplary process 200 for providing optimized recommendations. The process 200 may be performed automatically or semi-automatically by the components of the system 100, as previously described with reference to FIG. 1. It should be noted that in the following discussion, reference will be made, using like numerals, to the features described in FIG. 1.

At 202, business understanding is performed based on the data mining process model, e.g. cross industry standard process for data mining (CRISP-DM). Business understanding, for example, may be performed to understand what a customer wants to accomplish from a business perspective, with regards to a particular product or service. Business understanding reveals the important factors that should be selected as the data variables for the data pre-processing step 204. The selection of these factors may influence the analysis and recommendations of the potential customers provided by the recommendation system.

At 204, data pre-processing is performed. Data pre-processing includes selecting and quantizing the data variables. For example, data pre-processing may be performed by the recommendation engine 123. The quantized data is stored in the database 80. As discussed, different data variables may be selected for the analysis and recommendations for different types of products or services. In one embodiment, data variables (name, data type and description) of customers mined may include those describe in table 1.

TABLE 1

| Data variables | | |
|---|---|---|
| Variable Name | Data Type | Description |
| Gender | Boolean | The gender of the customer |
| Age | Integer | The age of the customer |
| Height | Double | The height of the customer |
| Weight | Double | The weight of the customer |
| Marital Status | String | The marital status of the customer |
| Region | String | The province or state of the customer |
| Education | String | The education level of the customer |
| Occupation | String | The profession of the customer |
| Income | Double | Monthly income of the customer |
| Risk Awareness | Integer | The risk awareness of the customer |
| Hobbies | String | The hobbies of the customer |

These variables may be selected for the analysis and recommendations of a life insurance product.

Quantization of variables is performed for every data variables for the convenience of analysis. Variables may be quantized into different data types, for example, Boolean, integer, double, and string data. Other data types may also be useful.

Data type may be a Boolean data. Boolean data is a data with only two possible values, e.g. A or B. For example, customer gender may be quantized as a Boolean data, e.g. either male (1) or female (2). There may be some exceptional cases that the gender is unknown (3).

Data type may be an integer data. Integer data is a data that represents some finite subsets of the mathematical integers. For example, to quantize the variable of customer age, 5 different categories may be defined, according to the typical insurance business requirements as shown in table 2.

TABLE 2

| Quantization of variable - Customer age | |
|---|---|
| Age (years old) | Integer data |
| Less than 18 | 1 |
| 18-30 | 2 |
| 31-60 | 3 |
| 61-80 | 4 |
| More than 80 | 5 |

Other categorizations of age group may also be useful.

Another example of integer data type is the quantization of variable of customer's risk awareness. Risk awareness is the acknowledgement of risks and the active process of reducing or eliminating those risks. Risk awareness may be evaluated by using a risk awareness questionnaire. For example, a risk awareness questionnaire for potential customers of a life insurance product includes, but not limited to, the aspects of financial habits, family history of terminal or critical illness etc. For example, risk awareness may be rated with the range from 1 to 10, according to the individual's perception, cognition and attitude toward risk. An exemplary risk awareness questionnaire is shown in table 3.

TABLE 3

Risk Awareness Questionnaire

| Questions | Answers |
|---|---|
| What is the problem you worry most about? | A. Life after retirement<br>B. Children's education<br>C. Medical expenses for serious illnesses |
| How does your family manage money matters? (can select multiple) | A. Savings<br>B. Bond<br>C. Insurance<br>D. stock<br>E. Fund<br>F. Others _____ |
| How do you usually save on medical expenses? | A. Savings<br>B. Social insurance<br>C. Commercial insurance<br>D. Social insurance and commercial insurance |
| Do you pay attention on insurance-related news in your daily life? | A. Usually<br>B. Occasionally<br>C. Never |
| How much do you know about insurance? | A. Knowledgeable<br>B. Know part of it<br>C. Not very clear |
| How many types of insurances have you bought or are intended to buy? (can select multiple) | A. Child education insurance<br>B. Pension insurance<br>C. Medical insurance<br>D. Savings bonus insurance<br>E. Accident insurance<br>F. Never had or have bought any insurance |
| If you buy insurance, how much are you willing to pay (e.g., % of annual income)? | A. 10% or less<br>B. 10%-20%<br>C. 20% or more |
| If you buy insurance, which one do you value most from an insurance company? | A. Brand awareness<br>B. Insurance rates and responsibilities<br>C. Good service<br>D. More outlets |
| Which is the key factor contributing to your purchase intention of insurance products? (can select multiple) | A. After-sales service<br>B. Salesman's introduction<br>C. Friends' recommendation<br>D. Income<br>E. Others _____ |
| Have you ever participated in any insurance activities? | A. yes<br>B. No |

Other methods of risk awareness evaluation may also be useful.

Data type may be a double data. A double data is data that is a floating data, e.g. not being used for precise value. For example, the quantization of customer's weight and height. Body mass index (BMI) may be derived from the weight and height of an individual, as shown in the following equation.

$$BMI = \frac{\text{Weight (kg)}}{\text{Height (m)}^2} \quad \text{Equation (1)}$$

BMI is an attempt to quantify the amount of tissue mass (e.g. muscle, fat and bone) of an individual. BMI may be used as a general indicator for certain health risks. Therefore BMI may be used to categorize customers in 5 different categories as shown in table 4.

TABLE 4

Quantization of variable - BMI

| BMI | Category | Double data |
|---|---|---|
| Less than 18.5 | Underweight | 1 |
| 18.5-25 | Normal | 2 |

TABLE 4-continued

Quantization of variable - BMI

| BMI | Category | Double data |
|---|---|---|
| 25-28 | Overweight | 3 |
| 28-32 | Moderately obese | 4 |
| More than 32 | Severely obese | 5 |

Other categorizations of BMI index may also be useful.

Another example of double data type is the quantization of variable of customer's annual income. For example, annual income may be used in this data pre-processing step as shown table 5.

TABLE 5

Quantization of variable - Customer's annual income

| Annual Income (CNY) | Double data |
|---|---|
| Less than 50,000 | 1 |
| 50,000-150,000 | 2 |
| 150,000-300,000 | 3 |
| 300,000-500,000 | 4 |
| 500,000-1,000,000 | 5 |
| More than 1,000,000 | 6 |

Other categorizations of annual income may also be useful.

Data type may be a string data. String data is used to store a sequence of elements, typically characters, using some character encoding. For example, the quantization of customer's educational background. To categorize customer's educational background, 7 incremental levels may be used as shown in table 6.

TABLE 6

Quantization of variable - Customer's educational background

| Educational background | String data |
|---|---|
| Junior high school and below | 1 |
| Senior middle school | 2 |
| Secondary school | 3 |
| College | 4 |
| Undergraduate degree | 5 |
| Master degree | 6 |
| Doctoral degree | 7 |

Other categorizations of educational background may also be useful.

Another example of string data is the quantization of the occupation of customers. A rating measure may be employed as shown in table 7. Rating from 1 to 10 may be graded in accordance with the average income, job benefits and occupational hazards. Higher score may reflect a higher occupational risk and thus a higher insurance need.

TABLE 7

Quantization of variable - Profession of customer

| Occupations | String data |
|---|---|
| Government/Agriculture/Forestry | 1 |
| Medical/Education/Training | 2 |
| Financial/Media/Advertising | 3 |
| Automotive/Telematics | 4 |
| Consulting/Outsourcing/Human Resources | 5 |
| Mechanical/Manufacturing/Trading | 6 |
| IT/Communications/Electronics | 7 |

TABLE 7-continued

Quantization of variable - Profession of customer

| Occupations | String data |
|---|---|
| Construction/Property Management/Real Estate | 8 |
| Logistics/Warehouse/Transportation | 9 |
| Energy industry/Heavy industry | 10 |

Other categorizations and examples of occupations may also be useful.

Other examples of string data type may be the quantization of the province of customer's residential address, marital status of customer and hobbies of the customer.

Figure 3A:
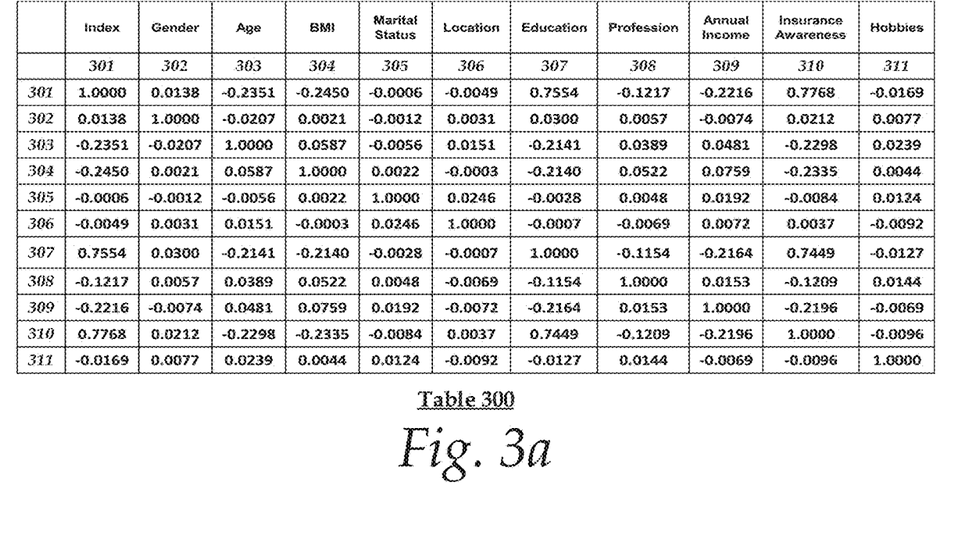
FIG. 3a shows an exemplary table that stores the numeral data for correlation analysis.

Numeric data is collected after the quantization of different data variables. At 206, data modeling is performed. For example, correlation analysis is performed to correlate the relationship of different variables with the customer purchase behaviour. R Packages, such as corrplot Package, may be used to perform the correlation analysis as shown in table 300 in FIG. 3a. Index 301 indicates the calculated correlation coefficient of different variables with the customer purchase behaviour. Variables (e.g. gender 302, age 303, BMI 304, marital status 305, residential region 306, educational background 307, occupation 308, annual income 309, risk awareness 310, and hobbies 311) are listed in each column and each row to perform the correlation analysis.

Figure 3B:
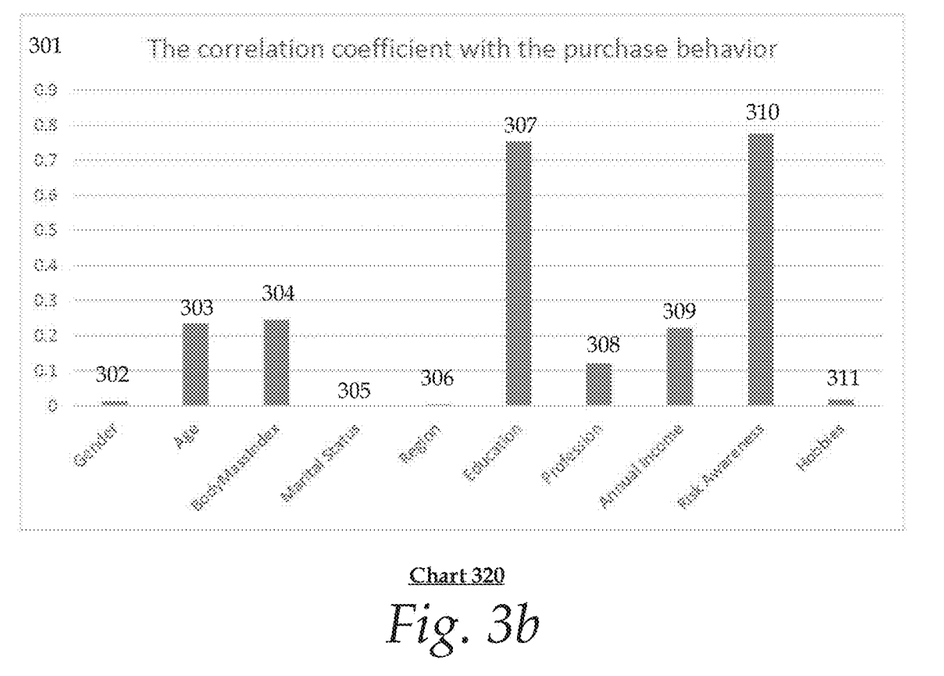
FIG. 3b shows an exemplary chart showing the correlation coefficient of different variables with the customer purchase behaviour.

FIG. 3b shows an exemplary chart resulted from a correlation analysis of 10 data variables. Index or correlation coefficient 301 shows the correlation coefficient of different variables (e.g. gender 302, age 303, BMI 304, marital status 305, residential region 306, educational background 307, occupation 308, annual income 309, risk awareness 310, and hobbies 311) with the customer purchase behaviour for a product or service. The higher the correlation coefficient indicates that there is a stronger relationship for this variable with customer purchase behaviour. For example, from the chart 320, data model for purchase behaviour of a life insurance product may be derived by selecting the variables with higher correlation coefficient, e.g. age 303, BMI 304, educational background 307, occupation 308, annual income 309 and risk awareness 310.

Figure 3C:
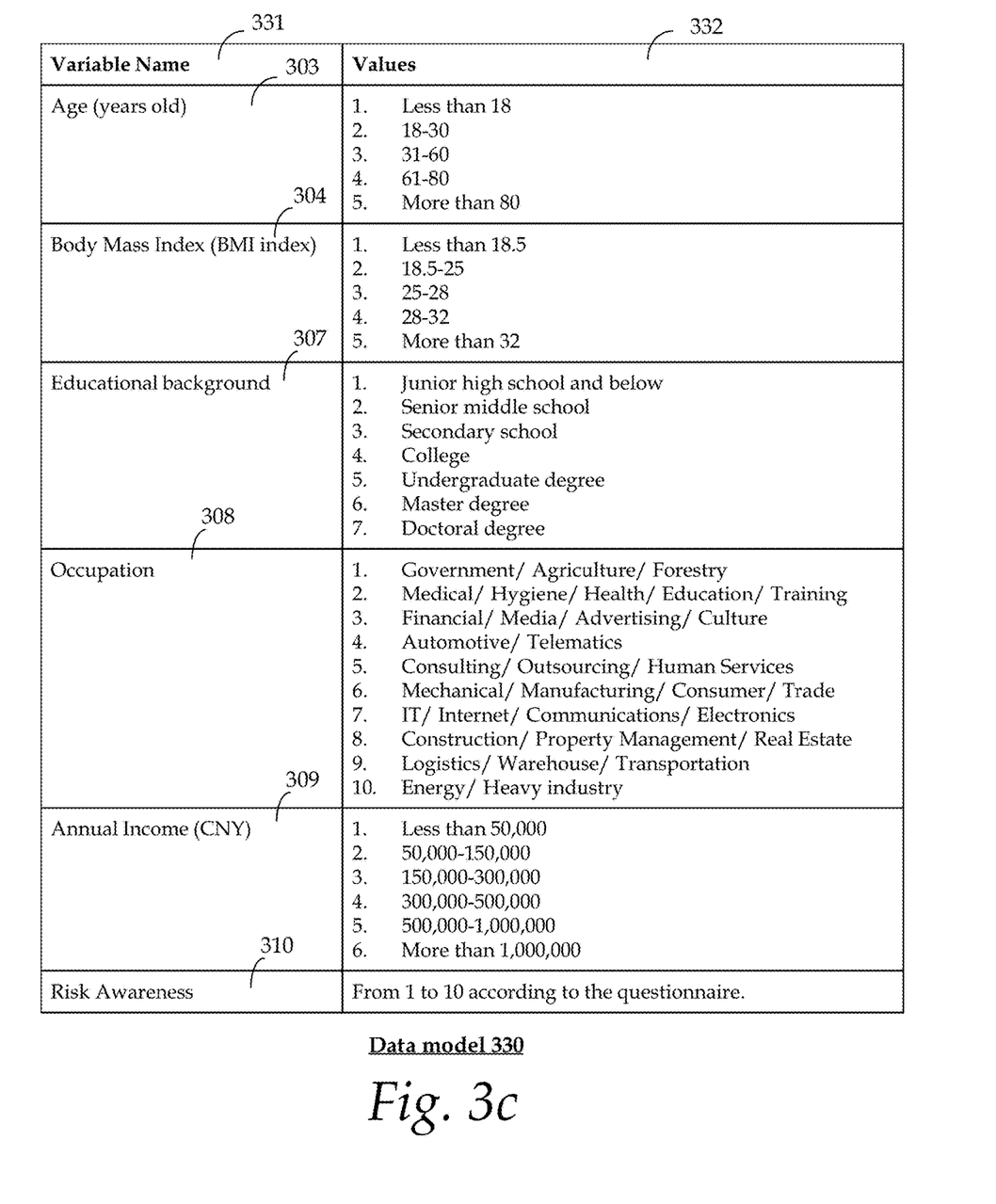
FIG. 3c shows an exemplary data model that is customized for modeling data of potential customers for a life insurance product.

An exemplary data model 330 is shown in FIG. 3c. For example, the data model 330 is customized for modeling data of potential customers for a product or service. For example, the product is a life insurance product. Data variables 331 (e.g. age 303, BMI 304, educational background 307, occupation 308, annual income 309 and risk awareness 310) are selected for the analysis and recommendations of a life insurance product. Values 332 of each data variables are quantized by the data pre-processing step, as shown in the data model. Other data models (e.g. other data variables, data types and correlation analysis methods) may be useful for other product or service of interest. Data modeling, for example, may be performed by the recommendation engine. The data model is stored in the database 80.

Referring back to FIG. 2, at 208, data processing is performed. Data processing includes an online model training process 220 by an online model training module 124, an offline model training process 222 by an offline model training module 125, an online-offline aggregation process 224 by an aggregation module 126, and an accuracy validation process 226 by a validation module 127. The accuracy validation process, for example, may include a F-measure technique. For example, data processing and accuracy validation may be performed by the recommendation engine 123. The processed data may be stored in the database 80.

Online model training is performed at the online model training process 220 by the online model training module 124. The online model training module includes an online modeling training technique. The online modeling training technique calculates and provides recommendations in real-time based on the real-time data. In one embodiment, Support Vector Machine (SVM) is used as a supervised learning method that analyzes data used for binary classification. SVM builds a model that assigns new examples to one category or the other category, making it a non-probabilistic binary linear classifier. In addition, SVM introduces a kernel induced feature space which casts non-linear data into a higher dimensional space where the data is separable. The higher dimensional space, e.g. support vector clustering space, is a measure of a system's likelihood to perform well on unseen data. Other online model training techniques may also be useful.

In one embodiment, a library for support vector machines (LIBSVM), an open source machine learning library, is being used in the online model training process. Other SVM formulations and libraries may also be useful. In one embodiment, C-support vector classification (C-SVC) is being implemented.

Given training vectors $x_i \in R^n$, i=1, . . . , l, in two classes, and an indicator vector $y \in R^l$ such that $y_i \in \{1, -1\}$, C-SVC solves the following primal optimization problem.

$$\min_{w,b,\xi} \frac{1}{2}w^T w + C\sum_{i=1}^{l} \xi_i \quad \text{Equation (2)}$$

$$\text{subject to } y_i(w^T \phi(x_i) + b) \geq 1 - \xi_i,$$

$$\xi_i \geq 0, i = 1, ..., l,$$

where $\phi(x_i)$ maps $x_i$ into a higher-dimensional space and C>0 is the regularization parameter.

Due to the possible high dimensionality of the vector variable w, the following dual problem is being solved.

$$\min_{\alpha} \frac{1}{2}\alpha^T Q\alpha - e^T \alpha \quad \text{Equation (3)}$$

$$\text{subject to } y^T \alpha = 0,$$

$$0 \leq \alpha_i \leq C, i = 1, ..., l,$$

where
e=[i=1, . . . , 1]$^T$ and is a vector of all ones,
Q is an l by l positive semidefinite matrix,
$Q_{ij} \equiv y_i y_j K(x_i, x_j)$, and
$K(x_i, x_j) \equiv \Phi(x_i)^T \varphi(x_j)$ and is the kernel function.
In one embodiment, radial basis function (RBF kernel) is being used as the kernel function. Other kernel function may also be useful.

Using the primal-dual relationship that solved by equation (3), the optimal ω satisfies:

$$w = \sum_{i=1}^{l} y_i \alpha_i \phi(x_i) \quad \text{Equation (4)}$$

The decision function is:

$$\text{sgn}(w^T \phi(x) + b) = \text{sgn}\left(\sum_{i=1}^{l} y_i \alpha_i K(x_i, x) + b\right) \quad \text{Equation (5)}$$

where $y_i \alpha_i \Lambda_i$, b, label names, support vectors, and other information, such as kernel parameters, are stored in the model for prediction.

Figure 4:
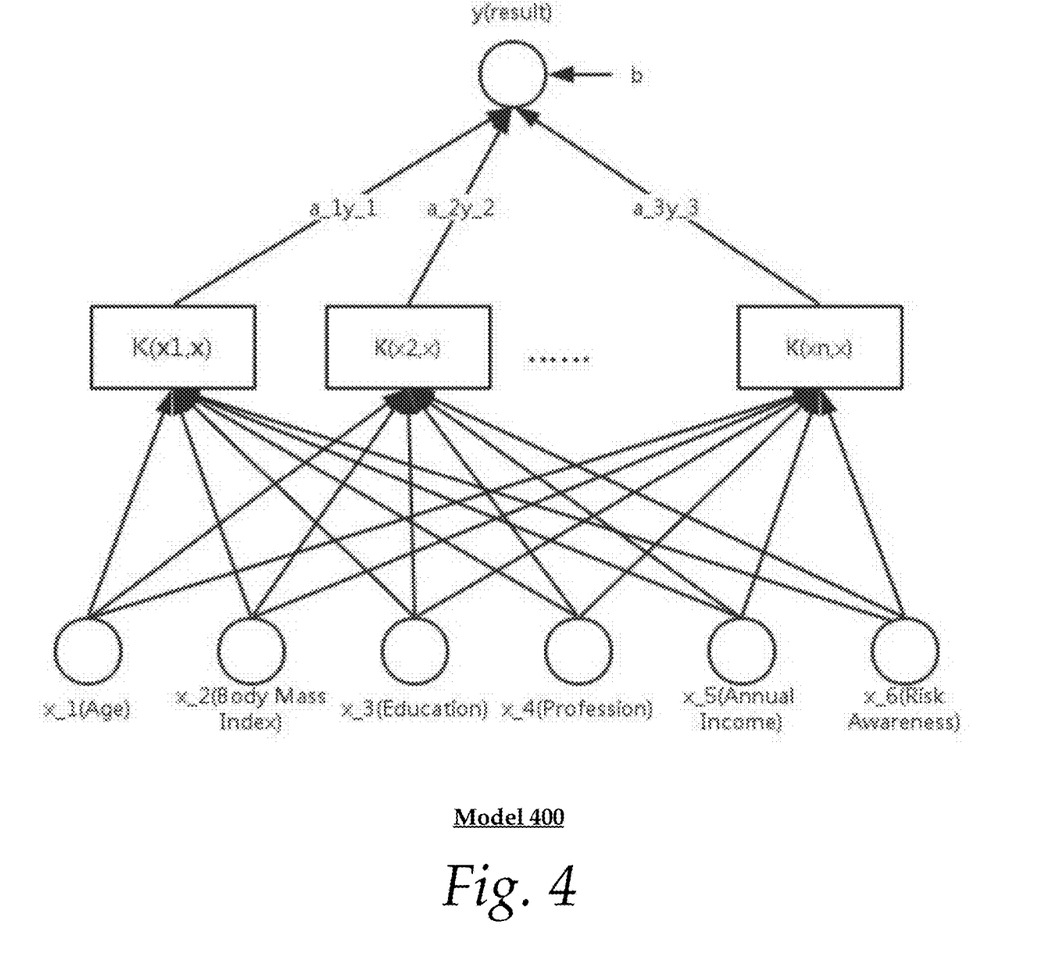
FIG. 4 shows an exemplary data model of support vector machines (SVM)

FIG. 4 shows an exemplary data model 400 of SVM. In one embodiment, x_1(Age), x_2(BMI), x_3(Education), x_4(Profession), x_5(Annual Income) and x_6(Risk Awareness) are the variables of the exemplary SVM classifier data model, and $x_1, x_2, x_3 \ldots, x_n$ represent the support vectors of this models, while k(x,y) is the kernel function of this model. For example, SVM classifier may be trained to learn from different characteristics of customers to build an optimized data model.

An accuracy validation process 226 may be performed to validate the accuracy of the online model training module by the validation module 127. For example, a F-measure method may be introduced to measure the accuracy of prediction algorithm using the SVM model. The F-measure method is a binary classification method to measure the accuracy of a test. It evaluates both the precision and the recall of the test. Other validation methods to evaluate the accuracy of the training module may also be useful.

An offline model training is performed at by an offline model training process 222 using the offline model training module 125. The offline model training module includes an offline modeling training technique. The offline modeling training technique calculates and provides recommendations offline based on the data stored in the database layer 130. Although the offline model training process may be relatively more time consuming, the prediction is more accurate. In one embodiment, an artificial neural network (ANN) is used as a supervised learning method. In one embodiment, back-propagation artificial neural network (BP-ANN) is implemented in the recommendation system. BP-ANN is a multi-layer feed-forward and back-propagate neural network. The BP-ANN, in one embodiment, calculates the gradient of a loss function with respect to all the weights in the network, as well as continuously calculating the network weight and deviation in the direction of gradient descent to approach the best objective function. Other offline model training techniques may also be useful.

Figure 5:
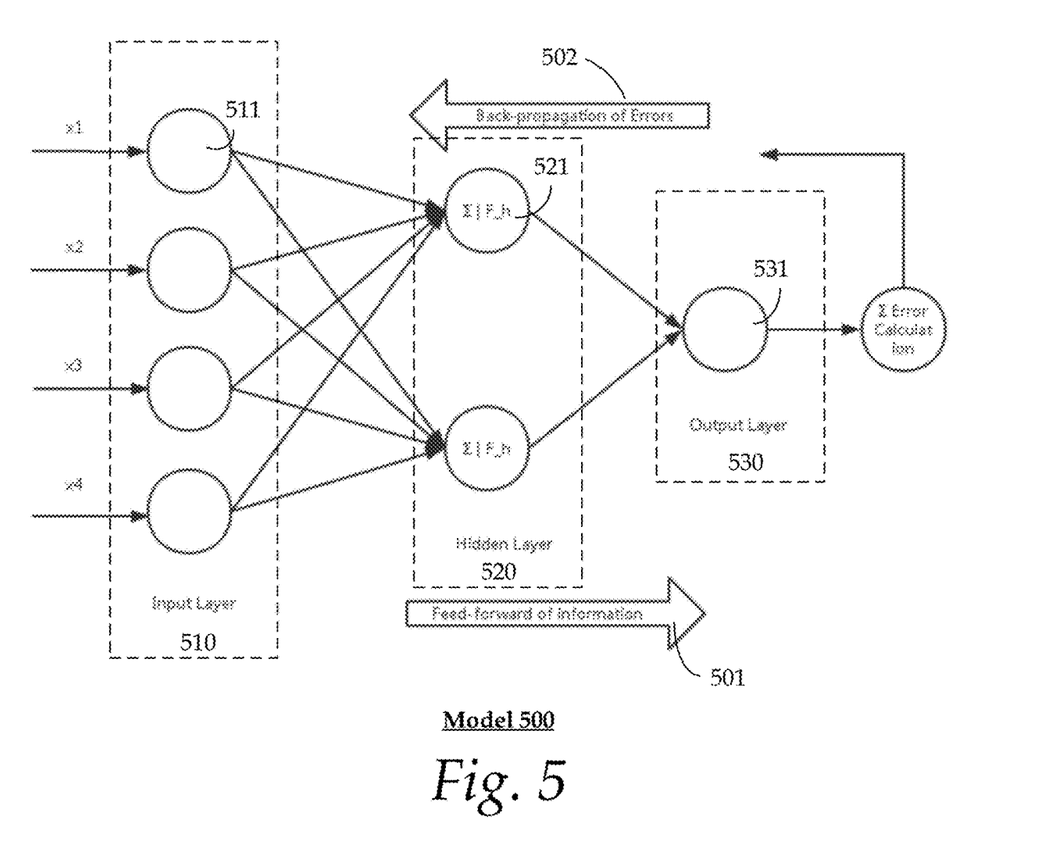
FIG. 5 shows an exemplary data model of a 3-layer back-propagation artificial neural network (BP-ANN)

FIG. 5 shows an exemplary data model 500 of a 3-layer BP-ANN. In one embodiment, BP-ANN is implemented as a two-phase process. The first phase includes an information feed-forward phase 501 and the second phase includes an error back-propagation phase 502. In the first phase, input information moves from the input neurons 511 in the input layer 510 to the hidden neurons 521 in the hidden layer 520, and then to the output neurons 531 in the output layer 530. Neurons in each layer are fed directly to the neurons of the subsequent layer via a series of weights. The output of the network at the output layer 530 is compared with the desired output, for example, using a loss function. An error value is calculated for each of the neurons in the output layer. In the second phase, the error values are propagated backwards, starting from the output neurons 531 in the output layer 530 to the hidden neurons 521 in the hidden layer 520, and then to the input neurons 511 in the input layer 510. The error values are subsequently updated with the weights of the neurons in each layer. The first and second phases are repeated until the output of the network reaches a desired result.

Figure 6:
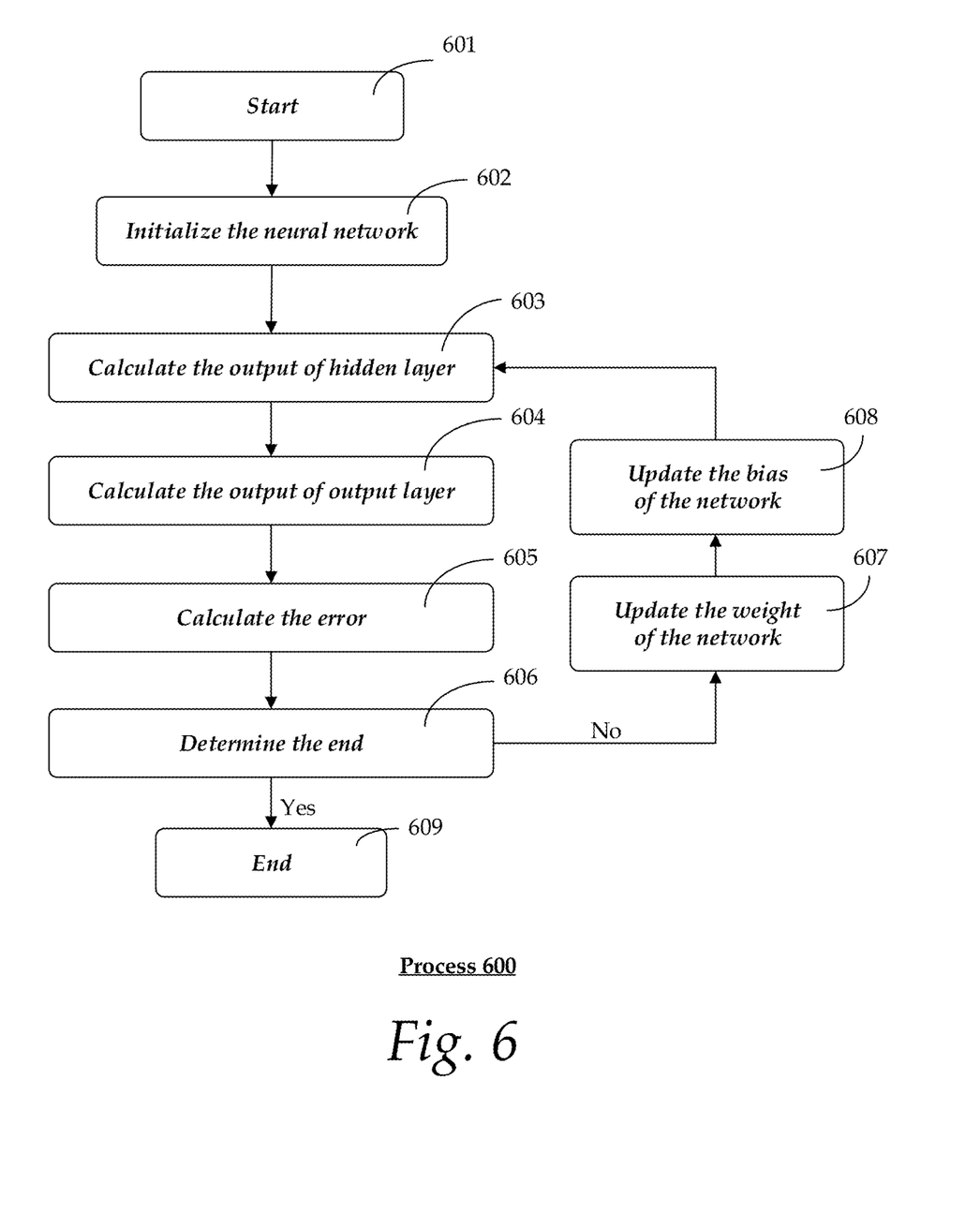
FIG. 6 shows an exemplary process of BP-ANN.

FIG. 6 shows an exemplary process 600 of a BP-ANN process. At 601, when an input value enters the network, the BP-ANN process starts. Refer to FIG. 5, where the number of nodes in the input layer 510 is n, the number of the nodes in the hidden layer 520 is l, the number of nodes in the output layer 530 is m. The weight from the input layer to the hidden layer is $w_{ij}$, the weight from the hidden layer to the output layer is $w_{jk}$, the bias from the input layer to the hidden layer is $a_j$, the bias from the hidden layer to the output layer is $b_k$. The learning rate is n, the excitation function is (x).

At 602, the network is initialized by an excitation function (g(x)):

$$g(x) = \frac{1}{1+e^{-x}} \qquad \text{Equation (6)}$$

At 603, the output of the hidden layer ($H_j$) is calculated:

$$H_j = g\left(\sum_{i=1}^{n} w_{ij}x_i + a_i\right) \qquad \text{Equation (7)}$$

At 604, the output of the output layer ($O_k$) is calculated:

$$O_k = \sum_{j=1}^{l} H_j w_{jk} + b_k \qquad \text{Equation (8)}$$

At 605, an error value E is calculated by an error formula:

$$E = \frac{1}{2}\sum_{k=1}^{m} (Y_k - O_k)^2 \qquad \text{Equation (9)}$$

The output of the output layer ($O_k$) and the desired output ($Y_k$) are being compared by $Y_k - O_k = e_k$. The error formula after comparison will become:

$$E = \frac{1}{2}\sum_{k=1}^{m} e_k^2 \qquad \text{Equation (10)}$$

where i=1 . . . n, j=1 . . . l, k=1 . . . m.

At 606, different ways are employed to determine whether the training technique has converged. In one embodiment, the difference between two adjacent errors is compared to the threshold of a pre-set maximum number of iterations. Other ways, such as to specify an iterative algebraic or to determine the difference between two adjacent errors to be less than a specified value, may also be useful.

At 607, if the requirement at 606 is not satisfied, for example, if the difference between two adjacent errors is less than the threshold of a pre-set maximum number of iterations, the weights of the network are updated. The update formula for the weights is:

$$\begin{cases} w_{ij} = w_{ij} + \eta H_j(1-H_j)x_i\sum_{k=1}^{m} w_{jk}e_k \\ w_{jk} = w_{jk} + \eta H_j e_k \end{cases} \qquad \text{Equation (11)}$$

At 608, the biases of the network are updated. The update formula for the biases is:

$$\begin{cases} a_j = a_j + \eta H_j(1-H_j)x_i\sum_{k=1}^{m} w_{jk}e_k \\ b_k = b_k + \eta e_k \end{cases} \qquad \text{Equation (12)}$$

At 609, if the requirement at 606 is satisfied, the process ends.

In one embodiment, the BP-ANN may be trained to learn from different customer's information to build an optimized offline model. Input information of the model is the customer's information mined and extracted from the database. For example, a whole neural network may be built according to the feed-forward input information and the back-propagation of errors.

The accuracy validation process 226 may be performed to validate the accuracy of the offline model training module by the validation module 127. For example, a F-measure method may be introduced to measure the accuracy of prediction algorithm using the BP-ANN model. The F-measure method is a binary classification method to measure the accuracy of a test. It evaluates both the precision and the recall of the test. Other validation methods to evaluate the accuracy of the training module may also be useful.

Referring to FIG. 2, at 224, an online-offline aggregation process is performed by an aggregation module 126. The online-offline aggregation process improves system performance. As discussed, the online model training process is faster than the offline model process. For example, the sample size of the online model training process may be limited to less than 10,000. While, the sample size of the offline training process is not limited, which requires more time to process and usually produces more accurate predictions. Therefore, by aggregating the outputs of both processes, a fast and accurate recommendation is achieved.

Figure 7A:
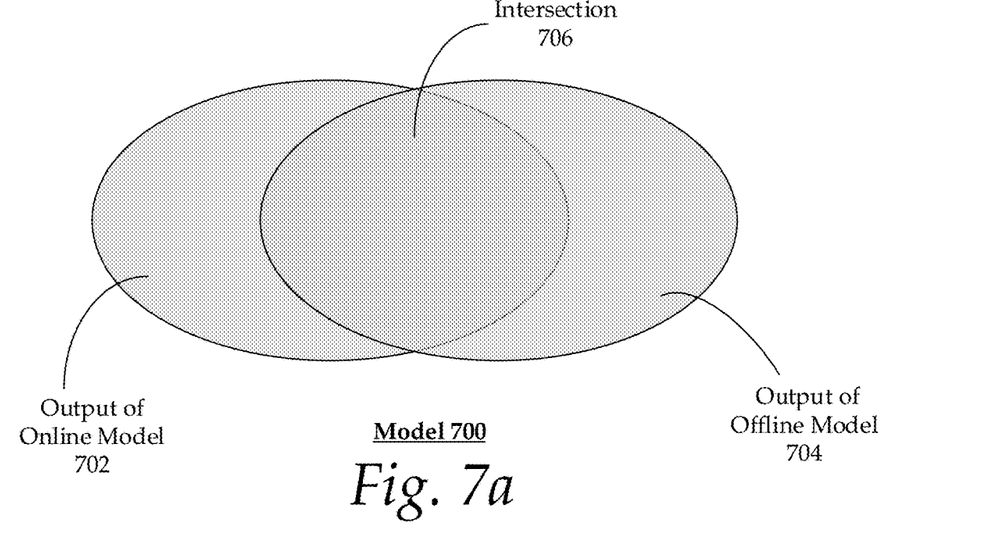
FIG. 7a shows an exemplary model for combining the outputs of an online trained model and an offline trained model.

FIG. 7*a* shows an exemplary model for combining outputs of an online trained model 702 and outputs of an offline trained model 704. An online model may be a SVM model; and an offline model may be a BP-ANN model. The intersection of outputs 706 are generated by an aggregation module 126. Outputs of an online trained model 702 are selected dynamically in real-time. An intermediate size of the latest customers is being selected and classified to provide quick responses upon recommendation requests submitted by client users (e.g. sales agents). Outputs of an offline trained model 704 are generated regularly offline. For example, the calculation is performed every week. Calculations performed at other time intervals may also be useful. The outputs of offline trained model are stored in the database. The outputs of offline trained model are being used to perform the online recommendations upon recommendation requests submitted by client users (e.g. sales agents).

Referring back to FIG. 1*b*, in one embodiment, the recommendation engine 123 is regularly refreshed to check for the update in the database layer. For example, the recommendation engine may be recalculated or refreshed every week. Other time intervals for refreshing the recommendation engine may also be useful. The recommendation model is updated by the recommendation engine. Outputs of the offline model are generated and stored in the database layer, in particularly the knowledge database 133. Upon client user's request, a re-calculated and optimized recommendation result, based on the updated recommendation model stored in the knowledge database, is generated and sent to the client user's device via the recommendation service 122 via a server. For example, optimized recommendations are provided based on the aggregation outputs of a trained SVM model and a trained BP-ANN model upon client user's request.

Figure 7B:
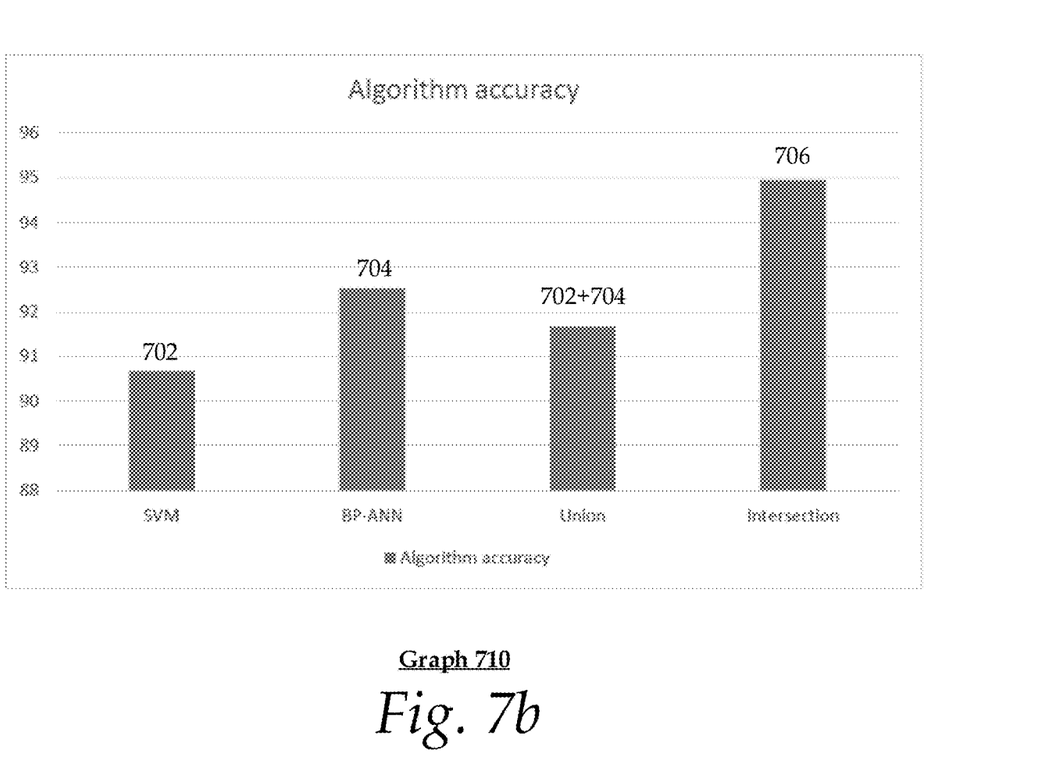
FIG. 7b shows an exemplary chart showing the accuracy of combining the outputs of an online trained model and an offline trained model.

Referring to FIG. 7*b*, an exemplary chart of the accuracy of combining the outputs of an online trained model and an offline trained model is shown. An online trained model may be a trained SVM model; and an offline trained model may be a trained BP-ANN model. The accuracy achieved by a trained SVM model is 90.67%; while the accuracy achieved by a trained BP-ANN model is 92.45%. If the client user (e.g. an insurance agent) wants to have a more accurate recommendation result in order to specifically target the potential customers, recommendation results (94.88% accuracy) may be derived from the intersection 706 of the outputs of the online model and the offline model. While, if the client user (e.g. an insurance agent) wants to have more numbers of potential customers, results (91.67% accuracy) may be derived from the union of the outputs of online model 702 and the outputs of offline model 704. To aggregate the outputs of an online trained model and an offline trained model can significantly improve the performance of the recommendation system, in terms of accuracy, operation time and customization features upon specific recommendation requests.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for providing recommendations, comprising:
    providing at least one data variable including a characteristic of customers of a product or service;
        analyzing the data variables by performing a correlation analysis;
        providing a data model of the analyzed data variables;
    based on the data model, performing offline training of a first model at regular intervals;
    based on a request from a user:
        determining results for the request using the offline-trained first model;
        performing online training of a second model and determining results for the request using the online-trained second model; and
        identifying common result items that separately occur in both the results determined using the offline-trained first model and the results determined using the online-trained second model; and
    providing recommendations based on the identified common result items.

2. The computer-implemented method of claim 1 wherein the offline training of the first model is performed every week.

3. The computer-implemented method of claim 1 wherein the first model is an artificial neural network (ANN).

4. The computer-implemented method of claim 3 wherein the ANN type is a 3-layer back-propagation artificial neural network (BP-ANN).

5. The computer-implemented method of claim 1 wherein the second model is a support vector machine (SVM).

6. The computer-implemented method of claim 5 wherein the SVM type is C-support vector classification (C-SVC).

7. The computer-implemented method of claim 6 wherein types of the data variables include one or more of Boolean data, integer data, double data, string data, or numeric data.

8. The computer-implemented method of claim 1 further comprising quantizing the data variables.

9. The computer-implemented method of claim 1 further comprising measuring the accuracy of the recommendations using an F-measure method.

10. A recommendation system, comprising:
a database; and
a recommendation engine configured to:
  perform offline training of a first model at regular intervals based on data in the database;
  based on a request from a user:
    determine results for the request using the offline-trained first model,
    perform online training of a second model and determine results for the request using the online-trained second model, and
    identify common result items that separately occur in both the results determined using the offline-trained first model and the results determined using the online-trained second model;
  provide recommendations based on the common result items; and
  measure the accuracy of the recommendations.

11. The system of claim 10 wherein the recommendations are potential customers for an insurance product, and wherein the potential customers are identified by the first model and the second model.

12. The system of claim 10 wherein the first model is an artificial neural network (ANN).

13. The system of claim 12 wherein the ANN type is a 3-layer back-propagation artificial neural network (BP-ANN).

14. The system of claim 10 wherein the second model is a support vector machine (SVM).

15. The system of claim 14 wherein the SVM type is C-support vector classification (C-SVC).

16. The system of claim 10 wherein the accuracy of the recommendations is measured using an F-measure method.

17. The system of claim 10 wherein the database comprises:
  a customer database configured to store information relating to customers;
  a sales database configured to store information relating to market; and
  a knowledge database configured to store analyzed data returned from the recommendation engine.

18. The system of claim 17 wherein the database is configured to store a data model, wherein the data model comprises analyzed data of at least one data variable, and wherein the at least one data variables represents a characteristic of the customers.

19. The system of claim 18 wherein a type of the at least one data variable includes one or more of Boolean data, integer data, double data, string data, or numeric data.

20. A computer-program product comprising computer-executable instructions embodied in one or more non-transitory computer-readable media that, when executed, causes a computing system to perform a method for providing recommendations, the method comprising:
  providing a plurality of data variables representing characteristics of customers;
  analyzing the data variables by performing a correlation analysis;
  providing a data model of the analyzed data variables;
  based at least in part on the data model, performing offline training of a first model at regular intervals using an artificial neural network (ANN);
  responsive to a request from a user:
    determining results for the request using the offline-trained first model,
    performing online training of a second model using a support vector machine (SVM) and determining results for the request using the online-trained second model, and
    identifying common result items that occur in both the results determined using the offline-trained first model and the results determined using the online-trained second model; and
  based on the common result items, generating a potential customer list; and
  providing a recommendation based on the potential customer list.

* * * * *